United States Patent
Wegner et al.

(10) Patent No.: US 12,324,432 B2
(45) Date of Patent: *Jun. 10, 2025

(54) HARD SURFACE CLEANING SOLUTION WITH RAPID VIRICIDAL ACTIVITY

(71) Applicant: ECOLAB USA INC., Saint Paul, MN (US)

(72) Inventors: Joseph Wegner, Saint Paul, MN (US); Mark Levitt, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,275

(22) Filed: Apr. 13, 2020

(65) Prior Publication Data

US 2020/0323199 A1    Oct. 15, 2020

Related U.S. Application Data

(60) Provisional application No. 62/833,274, filed on Apr. 12, 2019.

(51) Int. Cl.
| | | |
|---|---|---|
| A01N 31/08 | (2006.01) |
| A01N 25/34 | (2006.01) |
| A01N 31/02 | (2006.01) |
| C11D 1/22 | (2006.01) |
| C11D 1/722 | (2006.01) |
| C11D 1/831 | (2006.01) |
| C11D 3/20 | (2006.01) |
| C11D 3/43 | (2006.01) |

(52) U.S. Cl.
CPC ............ *A01N 31/02* (2013.01); *A01N 25/34* (2013.01); *A01N 31/08* (2013.01); *C11D 1/831* (2013.01); *C11D 3/2034* (2013.01); *C11D 3/43* (2013.01); *C11D 1/22* (2013.01); *C11D 1/722* (2013.01)

(58) Field of Classification Search
None
See application file for complete search history.

(56) References Cited

U.S. PATENT DOCUMENTS

| | | | |
|---|---|---|---|
| 3,414,370 A | 12/1968 | Baumgartner | |
| 4,474,750 A | 10/1984 | Gaffar et al. | |
| 4,612,331 A | 9/1986 | Barratt et al. | |
| 4,804,491 A * | 2/1989 | Choy | C11D 3/3947 |
| | | | 252/186.27 |
| 4,861,518 A * | 8/1989 | Morganson | C11D 1/72 |
| | | | 510/214 |
| 5,206,243 A | 4/1993 | Hofmann et al. | |
| 5,695,573 A | 12/1997 | Becker | |
| 5,744,440 A * | 4/1998 | Liu | C11D 3/28 |
| | | | 510/362 |
| 5,843,998 A | 12/1998 | Song et al. | |
| RE36,064 E | 1/1999 | Davidson et al. | |
| 5,942,478 A * | 8/1999 | Lopes | A61Q 19/10 |
| | | | 510/130 |
| 5,961,011 A | 10/1999 | Thomas et al. | |
| 5,997,885 A | 12/1999 | Koulbanis et al. | |
| 6,184,194 B1 | 2/2001 | Arvanitidou et al. | |
| 6,197,738 B1 | 3/2001 | Regutti | |
| 6,416,768 B1 | 7/2002 | Ravaux et al. | |
| 6,479,446 B1 * | 11/2002 | Sherry | C11D 1/65 |
| | | | 510/238 |
| 6,492,313 B1 | 12/2002 | Connors et al. | |
| 6,495,507 B1 | 12/2002 | Arvanitidou | |
| 6,521,578 B1 | 2/2003 | Stute et al. | |
| 6,617,296 B1 | 9/2003 | Connors et al. | |
| 6,632,784 B2 | 10/2003 | Massaux et al. | |
| 6,663,902 B1 | 12/2003 | Hei et al. | |
| 6,699,825 B2 † | 3/2004 | Rees | |
| 6,821,939 B1 | 11/2004 | Szewczyk et al. | |
| 6,964,788 B2 | 11/2005 | Phebus et al. | |
| 7,241,808 B2 | 7/2007 | Klein et al. | |
| 7,354,604 B2 * | 4/2008 | Ramirez | A01N 59/00 |
| | | | 424/616 |
| 7,470,653 B2 | 12/2008 | Gambogi et al. | |
| 7,517,844 B2 | 4/2009 | Diet et al. | |
| 7,592,300 B2 | 9/2009 | Taylor et al. | |
| 7,879,785 B2 | 2/2011 | Smith et al. | |
| 7,985,773 B2 | 7/2011 | Greten et al. | |
| 8,501,206 B2 | 8/2013 | Beilfuss et al. | |

(Continued)

FOREIGN PATENT DOCUMENTS

| | | |
|---|---|---|
| AU | 2006276877 B2 | 2/2007 |
| AU | 2007267952 B2 | 12/2007 |

(Continued)

OTHER PUBLICATIONS

Propylene glycol phenyl ether reference (Year: 2004).*
Microchem Laboratory reference (Year: 2016).*
Buckley et al., "Efficacy of Silver Dihydrogen Citrate and Steam Vapor against a Human Norovirus Surrogate, Feline Calicivirus, in Suspension, on Glass, and on Carpet", Applied and Environmental Microbiology, vol. 84, Issue 12, 12 pages, Jun. 2018.
International Searching Authority in connection with PCT/US2020/027911 filed Apr. 13, 2020, "The International Search Report and the Written Opinion of the international Searching Authority, or the Declaration", 26 pages, mailed Jul. 6, 2020.
Lloyd-Evans et al., "Chemical disinfection of human rotavirus-contaminated inanimate surfaces", J. Hyg. Camb., vol. 97, pp. 163-173, 1986.

(Continued)

*Primary Examiner* — Melissa S Mercier
*Assistant Examiner* — Caralynne E Helm
(74) *Attorney, Agent, or Firm* — McKee, Voorhees & Sease, PLC (57) ABSTRACT

The invention relates to fast-acting viricidal compositions and methods of using the same, wherein the compositions are capable of removing soil and effectively inactivating a wide variety of viral pathogens, particularly small, non-enveloped viruses such as poliovirus and norovirus. The compositions are especially useful on hard surfaces, and can easily be applied to a service to provide rapid viricidal efficacy.

5 Claims, 2 Drawing Sheets

(56) References Cited

U.S. PATENT DOCUMENTS

| | | | |
|---|---|---|---|
| 8,591,958 B2 † | 11/2013 | Omidbakhsh | |
| 10,238,108 B2 † | 3/2019 | Griese | |
| 2002/0016278 A1 | 2/2002 | Barbeau et al. | |
| 2002/0187918 A1 | 12/2002 | Urban | |
| 2002/0189022 A1 | 12/2002 | Chang | |
| 2003/0024556 A1 | 2/2003 | Guiramand et al. | |
| 2003/0044379 A1 | 3/2003 | Mahieu et al. | |
| 2003/0083219 A1* | 5/2003 | Rees | C11D 1/22 510/424 |
| 2004/0033190 A1 | 2/2004 | Suty et al. | |
| 2004/0101504 A1 | 5/2004 | Kinscherf et al. | |
| 2005/0148518 A1 | 7/2005 | McWilliam Leitch et al. | |
| 2005/0152934 A1 | 7/2005 | Casero | |
| 2005/0191393 A1 | 9/2005 | Postma et al. | |
| 2006/0062832 A1 | 3/2006 | Lopes | |
| 2006/0233661 A1* | 10/2006 | Langford | A61L 2/28 422/28 |
| 2007/0027119 A1* | 2/2007 | Ahmed | A01N 37/38 514/159 |
| 2008/0248988 A1 | 10/2008 | Gambogi et al. | |
| 2008/0267904 A1 | 10/2008 | Taylor et al. | |
| 2009/0233838 A1 | 9/2009 | Zaki | |
| 2011/0146707 A1* | 6/2011 | Cermenati | C11D 7/265 134/6 |
| 2011/0262557 A1* | 10/2011 | Omidbakhsh | A01N 59/00 424/616 |
| 2011/0272304 A1* | 11/2011 | Wahal | B08B 1/00 206/223 |
| 2012/0165240 A1 | 6/2012 | Finison et al. | |
| 2012/0232153 A1* | 9/2012 | Griese | A01N 41/04 514/576 |
| 2013/0266622 A1 | 10/2013 | McConaughy et al. | |
| 2013/0313154 A1* | 11/2013 | Hernandez | C11D 17/043 206/524.1 |
| 2014/0127141 A1 | 5/2014 | Ijaz et al. | |
| 2014/0134269 A1 | 5/2014 | Ijaz et al. | |
| 2014/0162932 A1 | 6/2014 | Hatakeyama et al. | |
| 2014/0179645 A1 | 6/2014 | Arndt | |
| 2014/0212361 A1 | 7/2014 | Ijaz et al. | |
| 2014/0343168 A1 | 11/2014 | Griese et al. | |
| 2015/0189888 A1 | 7/2015 | Ijaz et al. | |
| 2015/0237867 A1 | 8/2015 | Ijaz et al. | |
| 2015/0327544 A1 | 11/2015 | Apollo et al. | |
| 2017/0238550 A1 | 8/2017 | Ijaz et al. | |
| 2017/0247644 A1 | 8/2017 | Li et al. | |
| 2017/0258079 A1 | 9/2017 | Kiesel et al. | |
| 2017/0347644 A1 | 12/2017 | Silvernail et al. | |
| 2018/0002634 A1 | 1/2018 | Kleine et al. | |
| 2018/0007895 A1 | 1/2018 | Karandikar et al. | |
| 2018/0100083 A1* | 4/2018 | Gizaw | C11D 17/049 |
| 2018/0103636 A1 | 4/2018 | Man et al. | |
| 2018/0187129 A1* | 7/2018 | Traistaru | C11D 3/3942 |
| 2019/0090483 A1 † | 3/2019 | Hanson | |

FOREIGN PATENT DOCUMENTS

| | | | | |
|---|---|---|---|---|
| AU | 2010320708 B2 | 5/2011 | | |
| CA | 1130204 A | 8/1982 | | |
| CA | 1198680 A | 12/1985 | | |
| CA | 1314477 C | 3/1993 | | |
| CA | 1329367 C | 5/1994 | | |
| CA | 2313824 A1 | 1/2001 | | |
| CA | 2021379 C | 3/2001 | | |
| CA | 2192801 C | 9/2001 | | |
| CA | 2549554 A1 | 1/2002 | | |
| CA | 2114266 C | 11/2004 | | |
| CA | 2251941 C | 10/2006 | | |
| CA | 2397496 C | 7/2007 | | |
| CA | 2361929 C | 5/2009 | | |
| CA | 2625073 C | 5/2012 | | |
| EP | 0137615 A1 * | 4/1985 | | |
| EP | 0265979 B2 | 5/1988 | | |
| EP | 0422508 A2 | 4/1991 | | |
| EP | 0252276 B1 | 8/1992 | | |
| EP | 0287074 B1 | 11/1993 | | |
| EP | 0707794 B1 | 4/1996 | | |
| EP | 0882446 A1 | 12/1998 | | |
| EP | 1130083 A1 | 9/2001 | | |
| EP | 1372383 B1 | 1/2004 | | |
| EP | 1463795 B1 | 10/2004 | | |
| EP | 1466961 A1 | 10/2004 | | |
| EP | 1036146 B1 | 1/2005 | | |
| GB | 2378186 B | 2/2003 | | |
| GB | 2429015 A | 2/2007 | | |
| WO | 9114759 A1 | 10/1991 | | |
| WO | 9300089 A1 | 1/1993 | | |
| WO | 9309213 A1 | 5/1993 | | |
| WO | 9611250 A1 | 4/1996 | | |
| WO | 9624248 A1 | 8/1996 | | |
| WO | 0157174 A1 | 8/2001 | | |
| WO | 0194513 A1 | 12/2001 | | |
| WO | 02098224 A1 | 12/2002 | | |
| WO | 03014281 A1 | 2/2003 | | |
| WO | 03050229 A1 | 6/2003 | | |
| WO | 03080783 A1 | 10/2003 | | |
| WO | 03080784 A1 | 10/2003 | | |
| WO | 03080786 A1 | 10/2003 | | |
| WO | 03097779 A1 | 11/2003 | | |
| WO | 2004000016 A2 | 12/2003 | | |
| WO | WO-2004045281 A3 * | 9/2004 | | A01N 31/04 |
| WO | 2005118765 A1 | 12/2005 | | |
| WO | 2006042316 A1 | 4/2006 | | |
| WO | 2006062845 A2 | 6/2006 | | |
| WO | 2006062847 A2 | 6/2006 | | |
| WO | 2006062857 A2 | 6/2006 | | |
| WO | 2007044032 A2 | 4/2007 | | |
| WO | 2007115862 A2 | 10/2007 | | |
| WO | 2007145886 A2 | 12/2007 | | |
| WO | 2010037219 A1 | 4/2010 | | |
| WO | 2012010198 A1 | 1/2012 | | |
| WO | 2012024324 A1 | 2/2012 | | |
| WO | 2012130117 A1 | 10/2012 | | |
| WO | 2012138685 A1 | 10/2012 | | |
| WO | 2013012007 A1 | 1/2013 | | |
| WO | 2015022033 A1 | 2/2015 | | |
| WO | 2016041997 A1 | 3/2016 | | |

OTHER PUBLICATIONS

Sattar et al., "Chemical disinfection of non porous inanimate surfaces experimentally contaminated with four human pathogenic viruses", Epidem. Inf., vol. 102, pp. 493-505, Jan. 27, 1989.

Uner et al., "Efficiency of Laundry Polymers Containing Liquid Detergents for Hard Surface Cleaning", J. Sufact. Deterg., vol. 18, pp. 213-224, 2015.

\* cited by examiner
† cited by third party

HARD SURFACE CLEANING SOLUTION WITH RAPID VIRICIDAL ACTIVITY

CROSS-REFERENCE

This application is related to and claims priority under 35 U.S.C. § 119 to U.S. Provisional Application Ser. No. 62/833,274 filed on Apr. 12, 2019 and entitled "HARD SURFACE CLEANING SOLUTION WITH RAPID VIRICIDAL ACTIVITY"; the entire contents of this patent application are hereby expressly incorporated herein by reference.

TECHNICAL FIELD

The disclosure relates to fast-acting viricidal compositions capable of removing soil, as well as inactivating a wide variety of viral pathogens, including poliovirus and norovirus. The compositions are especially effective on hard surfaces.

BACKGROUND

Microbial and viral pathogens are an increasing public health concern. Pathogenic viruses present a significant health concern as they are able to persist on surfaces for longer periods of time and require complete and reliable inactivation in order to stop disease transmission. Such pathogens may often be present on many common objects and surfaces; the transmission of microbial and viral pathogens via contact with these objects and surfaces can cause illness or other health problems in humans and/or animals. As a result, disinfectant compositions are important for the prevention of bacterial and viral transmission of disease. However, the development of broad antiviral spectrum disinfectants with activity against both enveloped and non-enveloped viruses is limited due to the small number of compositions which can inactivate viruses.

The prevalence of microbial and viral pathogens is problematic especially for the healthcare industry, where microbial and viral pathogens can be transmitted by contact with healthcare surfaces contaminated with spillages or dispersion of body fluids from individuals carrying a bacteria, disease, infection, or virus. Surfaces in public and/or private facilities, such as counter tops, floors, bathroom furniture, etc. as well as food processing surfaces must often be treated with viricidal compositions to kill and remove pathogens.

In general, viruses can be identified according to a hierarchy that correspondences with the level of resistance to being inactivated. The three viral subgroups include small non-enveloped, large non-enveloped, and enveloped viruses. A viricidal product that is able to inactivate a small, non-enveloped virus is also able to inactivate any large, non-enveloped virus or any enveloped virus. Similarly, a viricidal product that can inactivate a large, non-enveloped virus is also able to inactivate any enveloped virus.

Poliovirus is an exemplary small, non-enveloped virus wherein there is a need to develop additional compositions for surface treatment. More specifically, poliovirus is a non-enveloped enteric RNA virus belonging to the Picornaviridae family and composed of 60 copies each of 4 repeating proteins (VP1, VP2, VP3, and VP4). Poliovirus can replicate in many cell types; in some cases, poliovirus can invade and replicate within the central nervous system (CNS), causing permanent motor neuron damage leading to paralysis. In addition, poliovirus can cause fever, headache, nausea and vomiting.

Polioviruses may be spread through feces and saliva, both by individuals infected with the disease, and also through the shedding of "live" oral polio vaccine. Although significant progress has been made towards global eradication of polio, there are still several countries globally where the wild poliovirus remains endemic. Additionally, there are several documented cases of polio due to circulating vaccine-derived poliovirus (cVDPV). As a result, there is still a risk of polio infection in those without vaccination or having a comprised immune system. Even though the risk of polio infection has been reduced, the ability of a composition to inactivate polio virions is significant because polioviruses are largely employed as model non-enveloped viruses. The poliovirus virion is acid resistant, making it resistant to many common disinfectants; thus the poliovirus is used as a model non-enveloped virus because inactivation of the poliovirus indicates broad spectrum antiviral effect both for other non-enveloped viruses but also across the viral hierarchy.

In addition to poliovirus, norovirus is another small, non-enveloped virus in need of additional viricidal compositions for surface treatment. The non-enveloped Norovirus (NoV), also known previously as "Norwalk-Like Virus" (NLV) or small round structured virus, is the most important viral pathogen of epidemic acute gastroenteritis that occurs in both developed and developing countries. NoV belongs to the Caliciviridae family and are icosahedral, single stranded, positive-sense RNA viruses whose capsids are composed of 180 copies of a single major structural protein. Noroviruses are estimated to cause 23 million cases of acute gastroenteritis in the United States per year, and are the leading cause of gastroenteritis in the United States. Of viruses, only the common cold is reported more often than viral gastroenteritis (norovirus). Norovirus causes nausea, vomiting (sometimes accompanied by diarrhea), and stomach cramps. This infection typically is spread from person to person by direct contact.

Noroviruses are very highly contagious and can spread easily from person to person. People can become infected with the norovirus in several ways, including, eating food or drinking liquids that are contaminated with norovirus; touching surfaces or objects contaminated with norovirus, and then placing their hands in their mouths; or having direct contact with another person who is infected and showing symptoms (for example, when caring for someone who is ill, or sharing foods or eating utensils with someone who is ill). During outbreaks of norovirus gastroenteritis, several modes of transmission have been documented, for example, initial foodborne transmission in a restaurant, followed by secondary person-to-person transmission to household contacts.

Accordingly there is a need to identify and develop viricidal compositions that can inactivate small, non-enveloped viruses, specifically poliovirus and norovirus, to then be able to have corresponding viricidal efficacy across the viral hierarchy.

Product distribution and dispersion poses another problem in the development of viricidal compositions. Even when an effective viricidal composition is developed, that composition must also be stable, fast-acting, and easy to quickly apply.

Many viricidal compositions rely on active agents which lack ideal shelf stability. For example, several viricidal compositions utilize chlorine-based compounds, such as sodium hypochlorite, as the active viricidal agent. However, chlorine is highly susceptible to degradation in response to changes in pH, temperature, and light, among others. Quaternary ammonium compounds are another potential viricidal active. However, quaternary ammonium compound-based formulations are often less effective against non-enveloped viruses, and there are growing concerns that quaternary ammonium compounds released into the environment can lead to bacterial resistance. Peroxide compositions represent another type of viricidal composition, however much like chlorine-based compounds, peroxides also have poor shelf stability and can be costly to manufacture. As a result, there is a need to develop stable viricidal compositions.

Further, as many viruses demonstrate viricidal resistance and can sometimes survive for long periods of time outside of the human body, the viricidal compositions must be fast-acting, i.e. must be able to quickly inactivate viruses and reduce the chance of the spread of infection. As a result, there is a need to develop compositions and methods to provide viricidal and disinfectant compositions against small, non-enveloped viruses (and also large, non-enveloped viruses and enveloped viruses), in a short contact time, preferably 10 minutes or less, more preferably 5 minutes or less, and most preferred 1 minute or less.

Finally, to facilitate the quick inactivation of pathogens and to reduce the risk of transmission, viricidal compositions should be easy to use and/or apply to a surface. For example, in some applications, such as hospitals, a powdered viricidal composition is applied to a surface to absorb liquids potentially contaminated with pathogens. However, it is difficult to measure the correct quantity of powder to apply, and this method requires the removal of additional solid materials from the surface. As a result, there is a need to develop effective viricidal compositions which may be easily applied to a surface, for example by spraying, flooding, and/or as wipe or pad pre-saturated with the composition.

Other objects, advantages and features of the present invention will become apparent from the following specification taken in conjunction with the accompanying figures.

BRIEF SUMMARY

An advantage of the viricidal compositions disclosed herein is that they provide improved cidal activity against a variety of bacteria and viruses, including, in particular enveloped and non-enveloped viruses. Importantly, it was found that it provides strong kill rates against polio which is notoriously difficult to kill. Another advantage of the viricidal compositions is that they provide surprising good cleaning and soil removal.

A preferred embodiment is directed to a concentrated viricidal composition comprising between about 0.4 wt. % and about 30 wt. % of an anionic sulfonated or sulfated surfactant; between about 5 wt. % and about 95 wt. % of a solvent having less than 5% (wt./wt.) solubility in water; wherein the composition has a pH of less than about 3.5 when diluted to a use solution.

Another preferred embodiment is directed to a ready-to-use viricidal composition comprising between about 0.1 wt. % and about 10 wt. % of an anionic sulfonated or sulfated surfactant; between about 1 wt. % and about 40 wt. % of a solvent having a less than 5% (wt./wt.) solubility in water; wherein the composition has a pH of less than about 3.5.

A preferred embodiment of the composition also includes methods of cleaning a surface comprising contacting a surface with a viricidal composition. As described herein, the compositions can be applied in any suitable method, including, but not limited to, pouring, spraying, wiping, mopping, or a combination thereof. In an aspect of the disclosure, the compositions can be saturated on a wipe, including, both pre-saturated or saturated at the time of use. Preferably, the compositions disclosed herein provides at least about 3 log reduction in polio in about 1 minute or less.

While multiple embodiments are disclosed, still other embodiments will become apparent to those skilled in the art from the following detailed description, which shows and describes illustrative embodiments of the invention. Accordingly, the figures and detailed description are to be regarded as illustrative in nature and not restrictive.

Various embodiments of the viricidal compositions and their methods of manufacture and use will be described in detail with reference to the figures. Reference to various embodiments does not limit the scope of the inventions. Figures represented herein are not limitations to the various embodiments according to the invention and are presented for exemplary illustration of the invention.

DETAILED DESCRIPTION OF THE PREFERRED EMBODIMENT

The present disclosure relates to stable, rapid-acting viricidal compositions, methods of making, and uses thereof. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to, mass, volume, time, temperature, pH, and log count of bacteria or viruses. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

The methods and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

The term "actives" or "percent actives" or "percent by weight actives" or "actives concentration" are used interchangeably herein and refers to the concentration of those ingredients involved in cleaning expressed as a percentage minus inert ingredients such as water or salts. It is also sometimes indicated by a percentage in parentheses, for example, "chemical (10%)."

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, acylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan. As used herein, the term "soil" or "stain" refers to a non-polar oily substance which may or may not contain particulate matter such as mineral clays, sand, natural mineral matter, carbon black, graphite, kaolin, environmental dust, etc.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing viricidal garment sprays, and non-to-low-aqueous food preparation lubricants, oils, and rinse additives.

As used herein, the phrase "food product" includes any food substance that might require treatment with a viricidal agent or composition and that is edible with or without further preparation. Food products include meat (e.g. red meat and pork), seafood, poultry, produce (e.g., fruits and vegetables), eggs, living eggs, egg products, ready to eat food, wheat, seeds, roots, tubers, leaves, stems, corns, flowers, sprouts, seasonings, or a combination thereof. The term "produce" refers to food products such as fruits and vegetables and plants or plant-derived materials that are typically sold uncooked and, often, unpackaged, and that can sometimes be eaten raw.

The term "hard surface" refers to a solid, substantially non-flexible surface such as a counter top, tile, floor, wall, panel, window, plumbing fixture, kitchen and bathroom furniture, appliance, engine, circuit board, and dish. Hard surfaces may include for example, health care surfaces and food processing surfaces.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmary, birthing, mortuary, and clinical diagnosis rooms. These surfaces can be those typified as "hard surfaces" (such as walls, floors, bed-pans, etc.,), or fabric surfaces, e.g., knit, woven, and non-woven surfaces (such as surgical garments, draperies, bed linens, bandages, etc.,), or patient-care equipment (such as respirators, diagnostic equipment, shunts, body scopes, wheel chairs, beds, etc.,), or surgical and diagnostic equipment. Health care surfaces include articles and surfaces employed in animal health care.

As used herein, the term "soft surface" refers to surfaces not classified as hard surfaces, but which are solid surfaces. Soft surfaces, include, but are not limited to, textiles, fabrics, woven surfaces, and non-woven surfaces. Soft surfaces, include, but are not limited to, carpets, curtains, fabrics, hospital partitions, linens, upholstery, padded seats, cushions, pillows, or a combination thereof.

As used herein, the term "instrument" refers to the various medical or dental instruments or devices that can benefit from cleaning with a composition according to the present invention.

As used herein, the phrase "meat product" refers to all forms of animal flesh, including the carcass, muscle, fat, organs, skin, bones and body fluids and like components that form the animal. Animal flesh includes, but is not limited to, the flesh of mammals, birds, fishes, reptiles, amphibians, snails, clams, crustaceans, other edible species such as lobster, crab, etc., or other forms of seafood. The forms of animal flesh include, for example, the whole or part of animal flesh, alone or in combination with other ingredients. Typical forms include, for example, processed meats such as cured meats, sectioned and formed products, minced products, finely chopped products, ground meat and products including ground meat, whole products, and the like.

As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning in a composition of the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressers, trocars, dilators, cages, glassware, tubing, catheters, cannulas, plugs, stents, scopes (e.g., endoscopes, stethoscopes, and arthroscopes) and related equipment, and the like, or combinations thereof.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

As used herein, the term "viricidal" refers to a compound or composition that reduces and/or inactivates a virus within about 10 minutes or less. Preferably, the term virucdal refers to a composition that provides at least about a 3-log reduction of the virus in about 10 minutes or less, more preferably at least about a 4-log reduction of the virus in about 10 minutes or less, most preferably about a 5-log reduction of the virus in about 10 minutes or less.

The term "virus", as used herein refers to a type of microorganism that can include both pathogenic and non-pathogenic viruses. Pathogenic viruses can be classified into two general types with respect to the viral structure: enveloped viruses and non-enveloped viruses. Some well-known enveloped viruses include herpes virus, influenza virus; paramyxovirus, respiratory syncytial virus, corona virus, HIV, hepatitis B virus, hepatitis C virus and SARS-CoV virus. Non-enveloped viruses, sometimes referred to as "naked" viruses, include the families Picornaviridae, Reoviridae, Caliciviridae, Adenoviridae and Parvoviridae. Members of these families include rhinovirus, poliovirus, adenovirus, hepatitis A virus, norovirus, papillomavirus, and rotavirus. It is known in the art that "enveloped" viruses are relatively sensitive and, thus, can be inactivated by commonly used disinfectants. In contrast, non-enveloped viruses are substantially more resistant to conventional disinfectants and are significantly more environmentally stable than enveloped viruses.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polypropylene polymers (PP), polycarbonate polymers (PC), melamine formaldehyde resins or melamine resin (melamine), acrylonitrile-butadiene-styrene polymers (ABS), and polysulfone polymers (PS). Other exemplary plastics that can be cleaned using the compounds and compositions of the invention include polyethylene terephthalate (PET) polystyrene polyamide.

The terms "water soluble" and "water dispersible" as used herein, means that the ingredient is soluble or dispersible in water in the viricidal compositions. In general, the ingredient should be soluble or dispersible at 25° C. concentration of between about 0.1 wt. % and about 15 wt. % of the water, more preferably at a concentration of between about 0.1 wt. % and about 10 wt. %. Sometimes ingredients, such as the solvents, can also be referred to as "sparingly soluble", which means the compositions are only soluble between about 0.5 wt. % and about 8 wt. % in water.

The term "weight percent," "wt. %," "wt-%," "percent by weight," "% by weight," and variations thereof, as used herein, refer to the concentration of a substance as the weight of that substance divided by the total weight of the composition and multiplied by 100.

Compositions

The compositions according to the present application may be as liquid concentrates or ready to use solutions. The desired concentration for a ready-to-use solution may be dependent on its end-use and application. Further, it should be understood that the concentrates may vary in their concentration based on the end dilution ratio and whether the concentrate is formulated as an anhydrous or aqueous formulation. Preferred concentrated compositions can be prepared according to Table 1A and preferred ready-to-use compositions can be prepared according to Table 1B. The pH of the compositions may range from about 5 to about 0, preferably between about 1 and about 3.5, and more preferably between about 2 and about 3.2, and all ranges therebetween. In an embodiment comprising a carrier, the carrier is preferably water or a water miscible solvent; however, some embodiments can be anhydrous and have less than about 5 wt. % water, more preferably less than about 1 wt. % water, most preferably less than about 0.5 wt. % water. In a preferred embodiment, the compositions contain less than about 1 wt. %, preferably less about 0.5 wt. %, more preferably less than about 0.1 wt. %, most preferably not include any added peroxide such as hydrogen peroxide. It should be understood that some chemicals prepared with peroxide, may contain residual peroxide, which is not to be considered added peroxide. Rather added peroxide refers to peroxide intentionally added to the compositions.

TABLE 1A

| Component | Exemplary Range 1 w/w % | Exemplary Range 2 w/w % | Exemplary Range 3 w/w % |
| --- | --- | --- | --- |
| Anionic Surfactant | 1-30 | 3-25 | 5-15 |
| Solvent | 5-95 | 30-95 | 60-95 |
| Buffering Agent | 0-10 | 0.01-8 | 0.01-5 |
| pH Modifier | 0-10 | 0.01-8 | 0.01-5 |
| Defoaming Agent | 0-10 | 0.01-8 | 0.01-5 |
| Nonionic Surfactant | 0-10 | 0.1-8 | 1-10 |
| Carrier | 0-q.s. | 0-15 | 0-5 |

TABLE 1B

| Component | Exemplary Range 1 w/w % | Exemplary Range 2 w/w % | Exemplary Range 3 w/w % |
| --- | --- | --- | --- |
| Anionic Surfactant | 0.1-10 | 0.2-5 | 0.2-3 |
| Solvent | 0.2-10 | 1-7 | 2-5 |
| Buffering Agent | 0-5 | 0.01-1 | 0.01-0.1 |
| pH Modifier | 0-5 | 0.01-1 | 0.01-0.2 |
| Defoaming Agent | 0-1 | 0.01-0.5 | 0.01-0.1 |
| Nonionic Surfactant | 0-10 | 0.01-1 | 0.01-0.5 |
| Carrier | 0-q.s. | q.s. | q.s. |

Surprisingly, the viricidal compositions of the present application demonstrate improved viricidal performance when the compositions are prepared with a relatively high ratio of solvent to anionic surfactant. In an embodiment, the ratio of solvent to anionic surfactant is between at least about 4:1, is at least about 5:1, is at least about 6:1, is at least about 7.5:1, is at least about 8:1, is at least about 9:1, is at least about 10:1, is at least about 15:1, is at least about 20:1, is at least about 25:1, is about 30:1, is at least about 40:1, is at least about 50:1, or is at least about 100:1.

In a preferred embodiment, the viricidal compositions provide at least about a 3-log reduction of a virus, more preferably at least about a 4-log reduction, most preferably equal to or greater than about 5-log reduction. Preferably, the viricidal compositions provide these reductions in about 10 minutes or less, more preferably about 5 minutes or less, still more preferably about 3 minutes or less, and most preferably in about 1 minute or less. In a most preferred embodiment, the viricidal compositions provide complete inactivation of a virus in less than about 10 minutes, including, but not limited to polio virus.

The viricidal compositions may include concentrate compositions which can be diluted to form use compositions or ready to use (RTU) compositions. Beneficially, the compositions overcome a limitation of the prior art in that dilutable concentrates can be provided. In general, a concentrate refers to a composition that is intended to be diluted with water to provide a use solution that contacts an object to provide the desired cleaning, viricidal efficacy, or the like. The viricidal composition that contacts the articles can be referred to as a ready-to-use composition (or use solution) dependent upon the formulation employed in the methods described herein. It should be understood that the concentration of the anionic surfactant(s), solvents, and any additional functional ingredients, in the composition will vary depending on whether the composition is provided as a concentrate or as a use solution.

A use solution may be prepared from the concentrate by diluting the solid or liquid concentrate with water at a dilution ratio that provides a use solution having desired detersive properties. The water that is used to dilute the concentrate to form the use composition can be referred to as water of dilution or a diluent, and can vary from one location to another. In a preferred embodiment, the dilution of the concentrated compositions can be at a dilution of about 0.5 oz per gallon to about 16 oz per gallon.

The liquid compositions can be provided in various forms well appreciated by those skilled in the art. The compositions can also be manufactured to include a saturated viricidal wipe, such as a paper or cloth substrate having the liquid compositions saturated thereon.

Anionic Sulfonated or Sulfated Surfactants

In a preferred embodiment, the compositions of the present invention include at least one anionic surfactant. In a preferred embodiment the surfactant is an anionic sulfonated or sulfated surfactant. In a preferred embodiment, the concentrated viricidal composition comprises between about 1 wt. % and about 30 wt. %, more preferably between about 3 wt. % and about 25 wt. %, and most preferably between about 5 wt. % and about 15 wt. % of the anionic sulfonated or sulfated surfactant. In a preferred embodiment, the ready-to-use viricidal composition comprises between about 0.1 wt. % and about 10 wt. %, more preferably between about 0.2 wt. % and about 5 wt. %, and most preferably between about 0.2 wt. % and about 3 wt. % of the anionic sulfonated or sulfated surfactant.

Anionic surfactants are surface active substances which are categorized by the negative charge on the hydrophile; or surfactants in which the hydrophilic section of the molecule carries no charge unless the pH is elevated to the pKa or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility.

In a preferred embodiment, the at least one surfactant is an anionic sulfonated surfactant. Anionic sulfonated surfactants suitable for use in the compositions also include alkyl sulfonates, the linear and branched primary and secondary alkyl sulfonates, and the aromatic sulfonates with or without substituents. In an aspect, sulfonates include sulfonated carboxylic acid esters. In an aspect, suitable alkyl sulfonate surfactants include C8-C22 alkylbenzene sulfonates, or C10-C22 alkyl sulfonates. In an exemplary aspect, the anionic alkyl sulfonate surfactant is linear alkyl benzene sulfonic acid (LAS). In a preferred embodiment employing LAS as the anionic surfactant, the compositions are most effective at pH 3.5 or below. In a further embodiment, the anionic sulfonate surfactant may alternatively or additionally include diphenylated sulfonates, and/or sulfonated oleic acid.

Anionic sulfated surfactants suitable for use in the compositions also include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule). In some cases, the alkylene oxide bridge can be propylene oxide rather than, or in addition to ethylene oxide.

Preferred anionic sulfonated or sulfated surfactants include, but are not limited to, C8-C22 alkylbenzene sulfonates, sulfonated oleic acid, sodium lauryl sulfate, sodium laureth sulfate, a sulfosuccinate, a secondary alkane sulfonate, or mixtures thereof.

In an embodiment, the viricidal compositions of the present application may be substantially or entirely free of other surfactants including, amphoteric surfactants, cationic surfactants, nonionic surfactants, zwitterionic surfactants, or other anionic surfactants.

We have found that the sulfonated surfactants are preferable as they are stable in an acidic environment, particularly in, aqueous compositions. Moreover, while sulfated surfactants are not acid-stable and thus are difficult to incorporate into acidic compositions, without being bound to the theory, we have reason to believe found that surprisingly the stability problems can be overcome by formulating the compositions to be anhydrous. Thus, a preferred embodiment is an anhydrous composition comprising a sulfated anionic surfactant. The anhydrous compositions comprising an anionic sulfated surfactant can also comprise a sulfonated surfactant.

Buffering Agent

In a further aspect, the compositions and methods may comprise a buffering agent. In a preferred embodiment, the composition employs a pH buffering agent with a pKa between about 2 and about 3. If a buffering agent is included in the compositions, it can be in any suitable amount to buffer the composition at a desired pH. In a preferred embodiment, the concentrated viricidal composition comprises between about 0 wt. % and about 10 wt. %, more preferably between about 0.01 wt. % and about 8 wt. %, and most preferably between about 0.01 wt. % and about 5 wt. % of a buffering agent. In a preferred embodiment, the ready-to-use viricidal composition comprises between about 0 wt. % and about 5 wt. %, more preferably between about 0.01 wt. % and about 1 wt. %, and most preferably between about 0.01 wt. % and about 0.1 wt. % of a buffering agent. In a preferred embodiment, the buffering agent is in an amount less than about 0.5 wt. %, more preferably less than about 0.1 wt. %

Preferred buffering agents include, but are not limited to, phosphonates, phosphonic acids, and/or phosphates. Exemplary buffering agents include a phosphonate salt(s) and/or a heterocyclic dicarboxylic acid, e.g., dipicolinic acid. In some embodiments, the buffering agent is a pyridine carboxylic acid-based buffers, such as picolinic acid and salts, pyridine-2,6-dicarboxylic acid and salts, and phosphonate based buffers, such as phosphoric acid and salts, pyrophosphoric acid and salts and most commonly 1-hydroxyethylidene-1,1-diphosphonic acid (HEDP) and salts. In other embodiments, the compositions and methods can comprise two or more buffering agents, e.g., HEDP and 2,6-pyridinedicarboxylic acid (DPA). Further, exemplary pH buffer agents include, but are not limited to, triethanol amine, imidazole, a carbonate salt, a phosphate salt, heterocyclic carboxylic acids, phosphonates, etc.

pH Modifiers

The viricidal compositions of the present application may include one or more pH adjusters/modifiers/buffers. The pH modifier may be alkaline or acidic and/or render a composition more alkaline or acidic. The pH modifier/buffer may be used to modify the pH and/or keep the pH of the composition in an optimal or preferred pKa range.

If a pH modifier is included in the compositions, it can be in any suitable amount to arrive at a desired pH. In a preferred embodiment, the concentrated viricidal composition comprises between about 0 wt. % and about 10 wt. %, more preferably between about 0.01 wt. % and about 8 wt. %, and most preferably between about 0.01 wt. % and about 5 wt. % of a pH modifier. In a preferred embodiment, the ready-to-use viricidal composition comprises between about 0 wt. % and about 5 wt. %, more preferably between about 0.01 wt. % and about 1 wt. %, and most preferably between about 0.01 wt. % and about 0.2 wt. % of a pH modifier.

Alkaline pH Modifier

The compositions may include one or more alkaline pH modifiers to adjust the compositions to a desired pH.

Suitable alkaline pH modifiers include, but are not limited to, one or more organic alkaline pH modifiers, one or more inorganic alkaline pH modifiers, or combinations thereof. Suitable organic alkaline pH modifiers include, but are not limited to, amines and strong nitrogen bases including, for example monoethanolamine, monopropanolamine, diethanolamine, dipropanolamine, triethanolamine, tripropanolamine, mixed isopropanolamines, and the like, or combinations thereof. Suitable inorganic alkaline pH modifiers include, but are not limited to, alkali metal hydroxides (e.g. sodium hydroxide, potassium hydroxide, or the like, or combinations thereof), alkali metal carbonates (e.g., sodium carbonate, potassium carbonate, sodium bicarbonate, potassium bicarbonate, sodium sesquicarbonate, potassium sesquicarbonate, and the like, or combinations thereof), alkali metal borates (e.g., sodium borate, potassium borate, and the like, or combinations thereof), alkali metal oxides (e.g., sodium oxide, potassium oxide, and the like, or combinations thereof), and the like, or combinations thereof. Examples of one or more alkaline pH modifiers include one or more of an alkanolamine and/or alkali metal carbonate.

A number of commercially available alkaline pH modifiers may be suitable for use in the viricidal compositions.

Commercially available alkaline pH modifiers may include amino alcohols include, but are not limited to, primary amino alcohols (e.g. 2-Amino-2-methyl-1-propanol), amino alcohols (e.g. 2-Amino-2-methyl-1-propanol), commercially available alkyl alkanolamines including, but not limited to, monoethanolamine and triethanolamine.

In an aspect, the alkaline pH modifiers can include ethanolamines and/or carbonates. In a further preferred aspect, the alkaline pH modifiers include monoethanolamine, diethanolamine, triethanolamine, 2-amino-2-methyl-1-propanol, monoisopropanolamine, diisopropanolamine, 2-(2-Aminoethoxyl)ethanol (DGA) and/or an alkali metal carbonate. In a further preferred aspect, the alkaline pH modifiers do not include caustic, including for example, any alkali metal hydroxides. In such preferred aspects, the alkaline pH modifiers monoethanolamine, caustic and/or other highly alkaline components are included at less than about 1 wt-% per component in a concentrate viricidal composition. In other aspects, such alkaline pH modifiers are excluded from the viricidal composition.

Acidic pH Modifier

The compositions may include an acidic pH modifier. In such an aspect, the acidic pH modifier can be a combination of a weak acid and a strong acid. Strong acids that can be used are acids which substantially dissocate an aqueous solution. "Weak" organic and inorganic acids are acids or acid components in which the first dissociation step of a proton from the acid moiety does not proceed essentially to completion when the acid is dissolved in water at ambient temperatures at a concentration within the range useful to form the present compositions.

Without wishing to be bound by theory, an acidic pH modifier are believed to affect the lipid envelope and/or capsid in the same manner. Moreover, the acidic pH modifiers disclosed herein facilitate the creation of a low pH buffer on the surface of a substrate, thereby prolonging the residual viricidal and viricidal activity of the compositions and products in which they are incorporated.

Exemplary strong acids suitable for use modifying the pH of the compositions include methane sulfonic acid, sulfuric acid, sodium hydrogen sulfate, phosphoric acid, phosphonic acid, nitric acid, sulfamic acid, hydrochloric acid, trichloroacetic acid, trifluoroacetic acid, toluene sulfonic acid, glutamic acid, and the like; alkane sulfonic acid, such as methane sulfonic acid, ethane sulfonic acid, linear alkyl benzene sulfonic acid, xylene sulfonic acid, cumene sulfonic acid and the like. In a preferred aspect, the compositions include a strong acid having a pKa less than about 2.5 to beneficially provide the acidic use compositions having a pH less than about 4, or preferably less than about 3. In an embodiment, the compositions include a strong acid in combination with the anionic surfactant, and optionally include a weak acid.

Exemplary weak acids suitable for use modifying the pH of the compositions include alpha hydroxycarboxylic acid, such as lactic acid, citric acid, tartaric acid, malic acid, gluconic acid, and the like; carboxylic acids, such as formic acid, acetic acid, propionic acid and the like; other common organic acids such as ascorbic acid, glutamic acid, levulinic acid, etc. could also be used. In a preferred aspect, the compositions include a weak acid having a pKa greater than about 2.5 to beneficially provide the acidic use compositions having a pH less than about 4, or preferably less than about 3. In an embodiment, the compositions include a weak acid in combination with the anionic surfactant, and optionally include a strong acid.

In a preferred embodiment, the compositions can contain less than 0.5 wt. %, preferably less than about 0.1 wt. %, more preferably less than about 0.01 wt. %, and most preferably free of a carboxylic acid, a strong acid, a weak acid, a peracid, or mixture thereof Solvent The viricidal compositions comprise an organic solvent. In a preferred embodiment, the concentrated viricidal composition comprises between about 5 wt. % and about 95 wt. %, more preferably between about 30 wt. % and about 95 wt. %, and most preferably between about 60 wt. % and about 95 wt. % of a solvent. In a preferred embodiment, the ready-to-use viricidal composition comprises between about 0.2 wt. % and about 10 wt. %, more preferably between about 1 wt. % and about 7 wt. %, and most preferably between about 2 wt. % and about 5 wt. % of a solvent.

In a preferred embodiment, the solvent is a hydrophobic oxygenated solvent. Exemplary solvents and solvent systems include limited water-solubility alcohols. In an aspect, a benzyl alcohol solvent and/or solvent system is employed. In a further aspect, a phenoxyethanol solvent and/or solvent system is employed. Without being limited to a particular mechanism of action, in some embodiments, the solvent provides a limited water solubility alcohol providing hydrophobicity that assists in comprising the virus. In an embodiment, the solvent has a solubility in water of preferably less than 15% water soluble, more preferably less than 8% water soluble, and most preferable less than 5% water soluble. Additional suitable solvents and solvent systems may include one or more different solvents including aromatic alcohols, ether amines, amidines, 1,2-diols, esters, glycol ethers, and mixtures thereof. Representative glycol ether solvents may include aromatic glycol ether solvents, such as ethylene glycol phenyl ether (commercially available from Dow as Dowanol Eph) or diethylene glycol phenyl ether (commercially available as Dowanol DiEPh). Additional suitable glycol ether solvents may include, without limitation, Butyl CARBITOL™ acetate, Butyl CARBITOL™, Butyl CELLOSOLVE™ acetate, Butyl CELLOSOLVE™, Butyl DIPROPASOL™, Butyl PROPASOL™, CARBITOL PM-600, CARBITOL Low Gravity, CELLOSOLVE acetate, CELLOSOLVE™, DOWANOL PPH™, DOWANOL TPnB, EEP™, FILMER IBT, Hexyl CARBITOL™, Hexyl CELLOSOLVE™, Methyl CARBITOL™, Methyl CELLOSOLVE acetate, Methyl CELLOSOLVE™, Methyl DIPROPASOL™, Methyl PROPASOL acetate, Methyl PROPASOL™, Propyl CARBITOL™, Propyl CELLOSOLVE™, Propyl DIPROPASOL™, and/or Propyl PROPASOL™.

Additional suitable solvents may include 1,8-Diazabicyclo[5.4.0]undec-7-ene, or also may be referred to as 2,3,4,6,7,8,9,10-Octahydropyrimidol[1,2-a]azepine (or DBU), 2.5.7.10-tetraoxaundecante (TOU), acetamidophenol, acetanilide, acetophenone, 2-acetyl-1-methylpyrrole, ethyl hexyl glycerine, benzyl acetate, benzyl alcohol, methyl benzyl alcohol, alpha phenyl ethanol, benzyl benzoate, benzyloxyethanol, ethylene glycol phenyl ether, a propylene glycol, propylene glycol phenyl ether, amyl acetate, amyl alcohol, 3-butoxyethyl-2-propanol, butyl acetate, n-butyl propionate, cyclohexanone, diacetone alcohol, diethoxyethanol, diethylene glycol methyl ether, diisobutyl carbinol, diisobutyl ketone, dimethyl heptanol, dipropylene glycol tert-butyl ether, 2-ethylhexanol, ethyl propionate, ethylene glycol methyl ether acetate, hexanol, isobutanol, isobutyl acetate, isobutyl heptyl ketone, isophorone, isopropanol, isopropyl acetate, methanol, methyl amyl alcohol, methyl n-amyl ketone, 2-methyl-1-butanol, methyl ethyl ketone, methyl isobutyl ketone, 1-pentanol, n-pentyl propionate, 1-propanol, n-propyl acetate, n-propyl propionate, propylene glycol ethyl ether, tripropylene glycol methyl ether, dipropylene glycol n-propyl ether, tripropylene glycol n-propyl ether, dipropylene glycol n-butyl ether, tripropylene glycol n-butyl ether, diethylene glycol n-butyl ether acetate, diethylene glycol monobutyl ether, ethylene glycol n-butyl ether acetate, ethylene glycol monobutyl ether, dipropylene glycol monobutyl ether, propylene glycol monobutyl ether, ethyl 3-ethoxypropionate, 2,2,4-Trimethyl-1,3-Pentanediol Monoisobutyrate, diethylene glycol monohexyl ether, ethylene glycol monohexyl ether, diethylene glycol monomethyl ether, diethylene glycol monoethyl ether, ethylene glycol methyl ether acetate, ethylene glycol monomethyl ether, dipropylene glycol monomethyl ether, propylene glycol methyl ether acetate, propylene glycol monomethyl ether, diethylene glycol monopropyl ether, ethylene glycol monopropyl ether, dipropylene glycol monopropyl ether and propylene glycol monopropyl ether. Representative dialkyl carbonates include dimethyl carbonate, diethyl carbonate, dipropyl carbonate, diisopropyl carbonate and dibutyl carbonate. Representative oils include benzaldehyde, pinenes (alphas, betas, etc.), terpineols, terpinenes, carvone, cinnamealdehyde, borneol and its esters, citrals, ionenes, jasmine oil, limonene, dipentene, linalool and its esters. Representative dibasic esters include dimethyl adipate, dimethyl succinate, dimethyl glutarate, dimethyl malonate, diethyl adipate, diethyl succinate, diethyl glutarate, dibutyl succinate, dibutyl glutarate and products available under the trade designations DBE, DBE-3, DBE-4, DBE-5, DBE-6, DBE-9, DBE-IB, and DBE-ME from DuPont Nylon. Representative phthalate esters include dibutyl phthalate, diethylhexyl phthalate and diethyl phthalate. Additional solvents include glycerin alkyl ethers such as mono 2-ethyl hexyl glycerin ether, mono heptyl glycerin ether, di butyl glycerin ether, etc. Also glycols such as 1,2 hexane diol and 1,2 octane diol.

Difficulties with the use of ester solvents in aqueous acidic solutions can potentially be overcome with this invention using an anhydrous composition.

In a preferred embodiment, the solvent is one or more of benzyl alcohol and/or a solvent from the Dowanol E series and/or Dowanol P series.

Additional Functional Ingredients

The components of the viricidal compositions can further be combined with various additional functional components. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. In certain embodiments one or more of the following additional functional ingredients may be preferred, defoamers, foaming agents, coupling agents, fragrances and/or dyes, additional surfactants, rheology modifiers or thickeners, solubilizers, hydrotropes, chelating/sequestering agents, and the like.

Defoaming Agents

Defoaming agents can also be included in the compositions. Generally, defoamers which can be used in accordance with the invention preferably include alcohol alkoxylates and EO/PO block copolymers. Defoamers can also include polyalkylene glycol condensates and propyl glycols, including polypropyl glycol. In some embodiments, the compositions can include antifoaming agents or defoamers which are of food grade quality given the application of the methods. To this end, one of the more effective antifoaming agents includes silicones. Silicones such as dimethyl silicone, glycol polysiloxane, methylphenol polysiloxane, trialkyl or tetralkyl silanes, hydrophobic silica defoamers and mixtures thereof can all be used in defoaming applications. In a preferred embodiment, the concentrated viricidal composition comprises between about 0 wt. % and about 10 wt. %, more preferably between about 0.01 wt. % and about 8 wt. %, and most preferably between about 0.01 wt. % and about 5 wt. % of a defoaming agent. In a preferred embodiment, the ready-to-use viricidal composition comprises between about 0 wt. % and about 1 wt. %, more preferably between about 0.01 wt. % and about 0.5 wt. %, and most preferably between about 0.01 wt. % and about 0.1 wt. % of a defoaming agent.

Additional Surfactants

The compositions of the present application may optionally include one or more additional surfactants. The one or more additional surfactants may comprise anionic, nonionic, amphoteric, and/or zwitterionic surfactants. In a preferred embodiment, the concentrated viricidal composition comprises between about 0 wt. % and about 10 wt. %, more preferably between about 0.1 wt. % and about 8 wt. %, and most preferably between about 1 wt. % and about 10 wt. % of an additional surfactant. In a preferred embodiment, the ready-to-use viricidal composition comprises between about 0 wt. % and about 10 wt. %, more preferably between about 0.01 wt. % and about 1 wt. %, and most preferably between about 0.01 wt. % and about 0.5 wt. % of an additional surfactant.

Nonionic Surfactants

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 (R-(EO)$_5$(PO)$_4$) and Dehypon LS-36 (R-(EO)$_3$(PO)$_6$); and capped alcohol alkoxylates, such as Plurafac LF221 and Tegoten EC11; mixtures thereof, or the like. In a preferred embodiment, the nonionic surfactant is Pluronic F127 an EO/PO block copolymer.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge. Due to the pH of the system, it was found that many amphoteric surfactants, particularly those based on a carboxylic acid, were incompatible. In particular, it was found that the protonated portion of the carboxylic acid based amphoteric surfactants will complex with the anionic surfactant causing precipitation. Thus, limited amphoteric surfactants were found to be compatible with the system. Preferred amphoteric surfactants which can be included have a sulfate or sulfonate group.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" Cosmetics & Toiletries, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropyl-sulfonate.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Sultaine surfactants are exemplary zwitterionic surfactants for use herein. A general formula for these compounds is:

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of sulfonate, sulfate, phosphonate, and phosphate groups.

Examples of zwitterionic surfactants having the structures listed above include: 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxy-propyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 3-[S-ethyl-S-(3-dodecoxy-2-hydroxypropyl) sulfonio]-propane-1-phosphate; 3-[P,P-dimethyl-P-dodecylphosphonio]-propane-1-phosphonate; and S[N,N-di (3-hydroxypropyl)-N-hexadecylammonio]-2-hydroxy-pentane-1-sulfate. The alkyl groups contained in said detergent surfactants can be straight or branched and saturated or unsaturated.

Sultaines useful in the present invention include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references is herein incorporated in their entirety.

In an embodiment, the compositions of the present invention include a betaine. For example, the compositions can include cocoamido propyl betaine.

Additional Anionic Surfactant

The viricidal compositions can optionally further comprise an additional anionic surfactant. Additional anionic surfactants can include anionic carboxylate surfactants, those which have a carboxylic acid or an alpha hydroxyl acid group. Anionic carboxylate surfactants suitable for use in the present compositions include carboxylic acids (and salts), such as alkanoic acids (and alkanoates), ester carboxylic acids (e.g. alkyl succinates), ether carboxylic acids, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R-O-(CH_2CH_2O)_n(CH_2)_m-CO_2X \quad (3)$$

in which R is a $C_8$ to $C_{22}$ alkyl group or in which IV is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12}$-13 alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

In some embodiments, the compositions can further comprise sodium xylene sulfonate, sodium cumene sulfonate, potassium naphthalene sulfonate, or a combination thereof.

In an embodiment, the compositions are optionally free of anionic carboxylate surfactants.

Water Conditioning Agents, Builders, Chelants, and/or Sequestrants

The compositions and methods can optionally include a water conditioning agent, builder, chelant, and/or sequestering agent, or a combination thereof. A chelating or sequestering agent is a compound capable of coordinating (i.e. binding) metal ions commonly found in hard or natural water to prevent the metal ions from interfering with the action of the other detersive ingredients of a viricidal composition. Similarly, builders and water conditioning agents also aid in removing metal compounds. Exemplary water conditioning agents include anti-redeposition agents, chelating agents, sequestering agents and inhibitors.

Suitable organic water conditioning agents can include both polymeric and small molecule water conditioning agents. Organic small molecule water conditioning agents are typically organocarboxylate compounds or organophosphate water conditioning agents. Polymeric inhibitors commonly comprise polyanionic compositions such as polyacrylic acid compounds. More recently the use of sodium carboxymethyl cellulose as an antiredeposition agent was discovered. This is discussed more extensively in U.S. Pat. No. 8,729,006 to Miralles et al., which is incorporated herein in its entirety.

Small molecule organic water conditioning agents include, but are not limited to: sodium gluconate, sodium glucoheptonate, N-hydroxyethylenediaminetriacetic acid (HEDTA), ethylenediaminetetraacetic acid (EDTA), nitrilotriacetic acid (NTA), diethylenetriaminepentaacetic acid (DTPA), ethylenediaminetetraproprionic acid, triethylenetetraaminehexaacetic acid (TTHA), and the respective alkali metal, ammonium and substituted ammonium salts thereof, ethylenediaminetetraacetic acid tetrasodium salt (EDTA), nitrilotriacetic acid trisodium salt (NTA), ethanoldiglycine disodium salt (EDG), diethanolglycine sodium-salt (DEG), and 1,3-propylenediaminetetraacetic acid (PDTA), dicarboxymethyl glutamic acid tetrasodium salt (GLDA), methylglycine-N-N-diacetic acid trisodium salt (MGDA), and iminodisuccinate sodium salt (IDS). All of these are known and commercially available.

Suitable inorganic water conditioning agents include, but are not limited to, sodium tripolyphosphate and other higher linear and cyclic polyphosphates species. Suitable condensed phosphates include sodium and potassium orthophosphate, sodium and potassium pyrophosphate, sodium tripolyphosphate, and sodium hexametaphosphate. A condensed phosphate may also assist, to a limited extent, in solidification of the solid detergent composition by fixing the free water present in the composition as water of hydration. Examples of phosphonates included, but are not limited to: 1-hydroxyethane-1,1-diphosphonic acid, $CH_3C(OH)[PO(OH)_2]_2$; aminotri(methylenephosphonic acid), $N[CH_2PO(OH)_2]_3$; aminotri(methylenephosphonate), sodium salt (ATMP), $N[CH_2PO(ONa)_2]_3$; 2-hydroxyethyl-iminobis(methylenephosphonic acid), $HOCH_2CH_2N[CH_2PO(OH)_2]_2$; diethylenetriaminepenta(methylenephosphonic acid), $(HO)_2POCH_2N[CH_2CH_2N[CH_2PO(OH)_2]_2]_2$; diethylenetriaminepenta(methylenephosphonate), sodium salt (DTPMP), $C_9H_{28-x}N_3Na_xO_{15}P_5$ (x=7); hexamethylene-diamine(tetramethylenephosphonate), potassium salt, $C_{10}H_{28-x}N_2K_xO_{12}P_4$ (x=6); bis(hexamethylene)triamine (pentamethylenephosphonic acid), $(HO_2)POCH_2N[(CH_2)_6N[CH_2PO(OH)_2]_2]_2$; and phosphorus acid, $H_3PO_3$. A preferred phosphonate combination is ATMP and DTPMP. A neutralized or alkaline phosphonate, or a combination of the phosphonate with an alkali source before being added into the mixture such that there is little or no heat or gas generated by a neutralization reaction when the phosphonate is added is preferred.

In an embodiment, the viricidal compositions can be substantially free of phosphates and/or phosphonates.

In addition to aminocarboxylates, which contain little or no NTA, water conditioning polymers can be used as non-phosphorous containing builders. Exemplary water conditioning polymers include, but are not limited to: poly-carboxylates. Exemplary polycarboxylates that can be used as builders and/or water conditioning polymers include, but are not limited to: those having pendant carboxylate (—$CO_2^-$) groups such as polyacrylic acid, maleic acid, maleic/olefin copolymer, sulfonated copolymer or terpolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein. These materials may also be used at substoichiometric levels to function as crystal modifiers conditioning agents can be in an amount from about 0.05 wt. % to about 7 wt. %; preferably from about 0.1 wt. % to about 5 wt. %; and more preferably from about 0.5 wt. % to about 3 wt. %.

Methods of Use

The viricidal compositions are configured to provide viricidal efficacy when in contact with a viricidal population; the compositions are also useful in treating surfaces in need of viricidal efficacy, including for example viricidal efficacy. In further aspects, the viricidal compositions are still further well suited for treating surfaces in need of viricidal efficacy against small, non-enveloped viruses, large, non-enveloped viruses and/or any enveloped viruses. In a particular, aspect, the viricidal compositions are particularly well suited for treating surfaces in need of inactivating small, non-enveloped viruses including, but not limited to, poliovirus, feline calicivirus, and/or norovirus.

Accordingly, methods of using a viricidal are encompassed according to the present disclosure. Methods of inactivating a virus are also encompassed according to the present disclosure. Methods of inactivating a small, non-enveloped virus are also encompassed according to the present disclosure. Still further, methods of inactivating a poliovirus and/or norovirus are encompassed according to the present disclosure.

The methods of use for viricidal, including antiviral, disinfection along with inactivating viruses, include a contacting step, wherein the viricidal compositions disclosed herein are applied to a surface in need of treatment. In an aspect, the contacting step involves contacting the composition with a surface contaminated with a virus, including enveloped and non-enveloped viruses, such as a caliciform virus including norovirus and/or poliovirus. Beneficially, in an aspect, complete kill of one or more viruses on a surface is achieved with a contact time of less than 10 minutes, less than 5 minutes, less than 2 minutes, less than 1 minute, or less than 30 seconds.

In an embodiment, the contacting may involve contacting the viricidal composition with a food contact and/or non-food contact hard surface. Such surfaces can further include instruments, such as medical instruments. Surfaces can also include those cleaned in third-sink sanitizing, including various wares. In still further aspects, contacting the composition can be to a CIP (clean in place) application. In still further aspects, contacting the composition may be contacting the composition with a ware wash machine, such as a ware wash application.

In still further aspects, contacting the composition may include contacting the composition with a tissue surface, including tissue treatment applications. Exemplary tissue surfaces include mammalian skin, such as animal or human skin, including for example human hands.

The various surfaces to which the compositions can be applied can include any conventional application means. Suitable applications can include, for example, by wiping, spraying, pouring, mopping, dipping, immersing, or the like. The contacting can also include providing a solid to be first dissolved in water to form a solution for the contacting. The contacting step allows the composition to contact the surface for a predetermined amount of time. The amount of time can be sufficient to allow, including from a few seconds to an hour, from about 30 seconds to about 15 minutes, or any range therebetween. The methods may comprise a single step of applying the composition onto the surface without direct physical removal, such as a rinse step. In an embodiment, the compositions can be on a wipe such that the wipe can be applied to a surface. In a preferred embodiment, the viricidal compositions can be on a pre-saturated wipe. In another preferred embodiment, a wipe can be saturated with the viricidal compositions at or before the time of use manually or by a machine or system. In an embodiment, where the composition is saturated on a wipe, the wipe is preferably comprised of a polyester, a polypropylene, a polyamide, a cellulose, a rayon, or a blend or combination thereof.

In some aspects, the methods can further include a pre-cleaning step, such as where a viricidal compositions is applied, wiped and/or rinsed, and thereafter followed by the applying of the compositions. The compositions and methods of use thereof can include treating cleaned or soiled surfaces Methods of Manufacture The viricidal compositions can be prepared by mixing of the ingredients in the compositions. They can be prepared as concentrated compositions or ready-to-use compositions. If prepared as concentrated compositions, the concentrated viricidal compositions can be subsequently diluted at the time of use or before use. The viricidal compositions can be prepared using in-line mixing or in bulk mixing. Further, the viricidal compositions can be prepared in batch or continuous mixing processes.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

It should be understood that these Examples, while indicating certain embodiments of the invention, are given by way of illustration only and are non-limiting. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Materials Used:

Akypo® LF 4: An anionic/nonionic surfactant blend containing carboxylic acids, available from Kao Chemical.

Dodecylbenzene sulfonic acid (DdBSA), an exemplary anionic linear alkylbenzene sulfonic acid, available from multiple commercial sources.

Alpha olefin (C14-16) sulfonate, an exemplary anionic sulfonated surfactant, available from multiple commercial sources.

Sodium octyl sulfonate, an exemplary anionic sulfonated surfactant, available from multiple commercial sources.

Sodium Laureth Sulfate, an anionic surfactant, available from multiple commercial sources.

Sodium Lauryl Sulfate, an anionic surfactant, available from multiple commercial sources.

Diphosphonic acid, available from multiple commercial sources.

DOWANOL™ DPnB: a hydrophobic glycol ether solvent, available from DOW Chemical.

Dowfax™ 8390: An anionic disulfonated diphenyl oxide, available from DOW Chemical.

Sulfonated oleic acid, a fatty acid sulfonate, available from multiple commercial sources.

Pluronic F127: an exemplary EO/PO block copolymer available from Sigma Aldrich.

Sodium xylene sulfonate, an anionic surfactant, available from multiple commercial sources.

STEPWET® DOS 70: A biodegradable sulfosuccinate, available from Stepan.

Example 1. Viricidal Suspension Test

An evaluation was conducted to determine the viricidal efficacy of the compositions of the present application against a test virus in suspension. The stock virus of feline calicivirus, a norovirus surrogate, was diluted to a titer of approximately 6-$\log_{10}$ infectious unites per 0.1 ml. In addition, the virus sample was also loaded with organic soil present at 5 wt. % of the sample. The prepared sample was then added to the test compositions, which were prepared as set forth in Tables 2A and 2B at a ratio of one parts virus and 9 parts test product. Contact was allowed for one minute. After one minute, the test compositions and virus/soil samples were neutralized, placed in media, and allowed to incubate. After the close of the incubation period, the samples treated with the composition were examined and a log count of any remaining infectious viruses was quantified. The log virus reduction as measured for each formulation after 1 minute is shown in FIGS. 1A and 1B.

TABLE 2B

| | Formulas (wt. %) | | | | | | |
|---|---|---|---|---|---|---|---|
| Ingredients | 1J | 1K | 1L | 1M | 1N | 1O | 1P |
| water | 94.48 | 89.98 | 90.43 | 91.48 | 90.94 | 95.94 | 99.456 |
| DdBSA | 0 | 0.5 | 0.05 | 0 | 0.3 | 0.3 | 0 |
| Benzyl Alcohol | 0 | 4 | 4 | 0 | 0 | 0 | 0 |
| Propylene glycol | 5 | 5 | 5 | 5 | 5 | 0 | 0 |
| Diphosphonic Acid | 0.02 | 0.02 | 0.02 | 0.02 | 0.02 | 0.02 | 0.02 |
| sodium hydroxide 50% sol. | 0 | 0.08 | 0 | | 0.24 | 0.24 | 0.024 |
| Pluronic F127 | 0.5 | 0.5 | 0.5 | 0.5 | 0.5 | 0.5 | 0.5 |
| Phenoxyethanol | 0 | 0 | 0 | 3 | 3 | 0 | 0 |
| DOWANOL DPnB | 0 | 0 | 0 | 0 | 0 | 3 | 0 |
| 70% Methane sulfonic acid | 0 | 0 | 0 | 0.015 | 0 | | 0.0235 |
| pH (100%) | 2.74 | 2.2 | 2.58 | 2.69 | 2.23 | 2.4 | 2.62 |

Figure 1A:
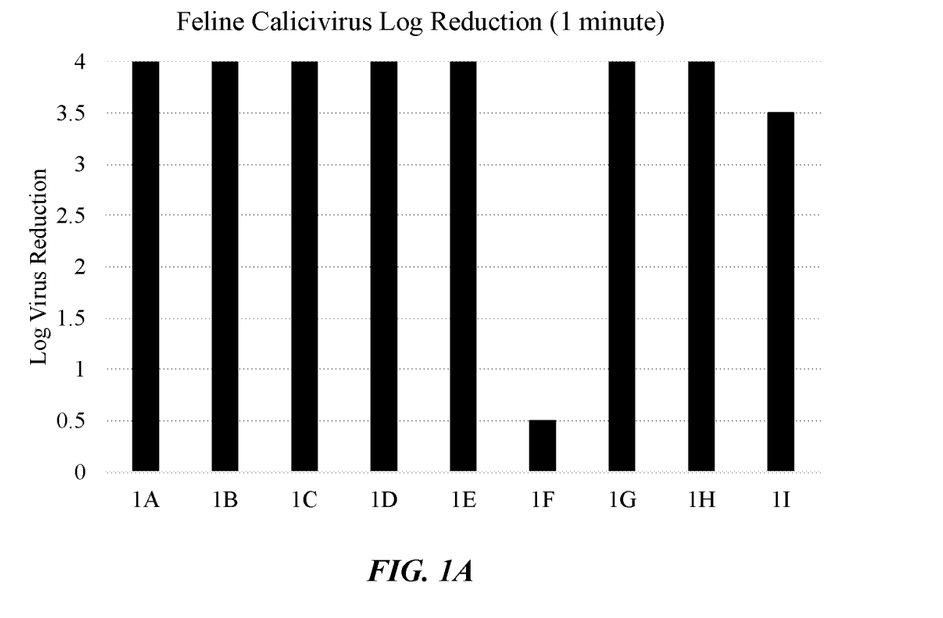
FIG. 1A shows the log virus reduction of feline calicivirus after being contacted with nine different exemplary viricidal compositions for one minute.
Figure 1B:
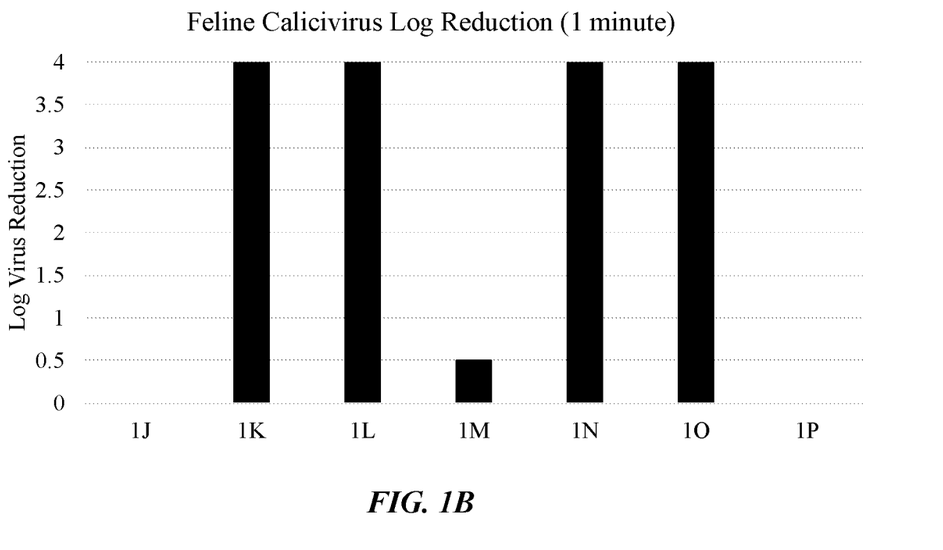
FIG. 1B shows the log virus reduction of feline calicivirus after being contacted with seven additional exemplary viricidal compositions for one minute.

As seen in FIG. 1A, the majority of the formulations resulted in a log virus reduction of at least 4.0, with the exception of Formula 1F and 1I where those formulations only achieved a log reduction of 0.5 and 3.5 respectively. As seen in FIG. 1B, Formula 1K, 1L, 1N, and 1O all achieved a log virus reduction of at least 4.0. The compositions of Formula 1J, 1M, and 1P did not achieve effective virus reduction outcomes with a log virus reduction of 0.0, 0.5, and 0.0 respectively. These results indicate that certain weight formulations of the exemplary composition, such as Formula 1A, are effective against feline calcivirus at 1 minute.

Figure 2A:
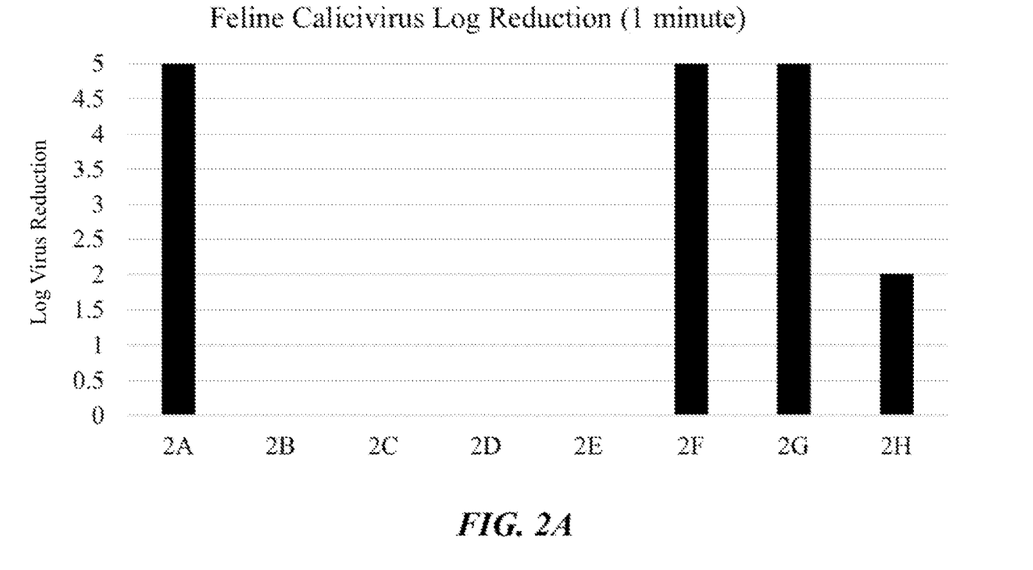
FIG. 2A shows the log virus reduction of feline calicivirus after being contacted with nine different exemplary viricidal compositions for one minute when the surfactants in each of the exemplary compositions was varied to assess surfactant impact of cidal activity.
Figure 2B:
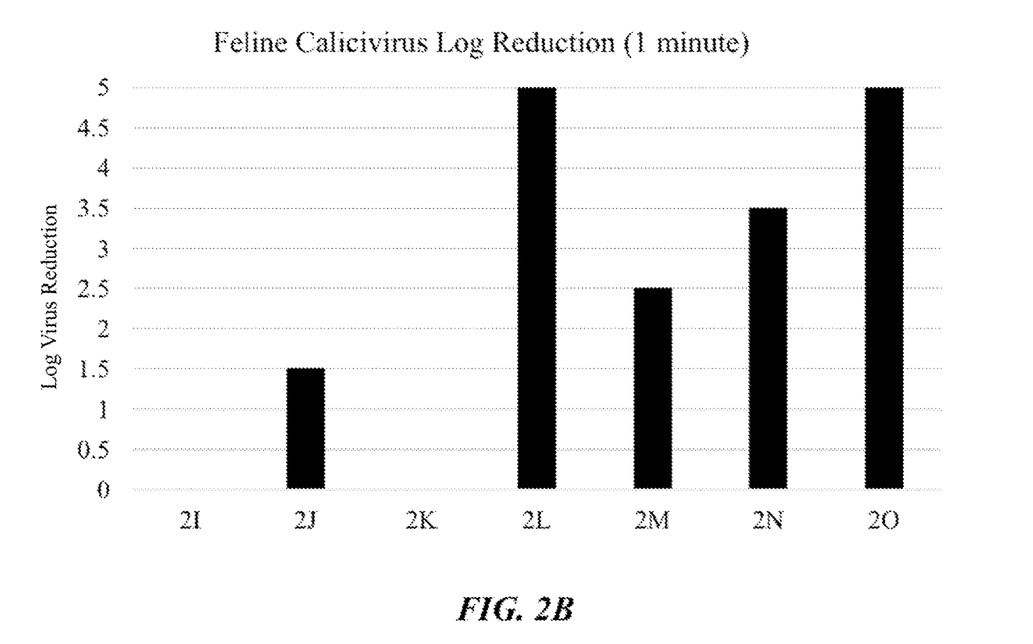
FIG. 2B shows the log virus reduction of feline calicivirus after being contacted with seven additional exemplary viricidal compositions for one minute when the surfactants in each of the exemplary compositions was varied to assess surfactant impact of cidal activity.

Furthermore, an exemplary concentrated viricidal composition was prepared according to a preferred embodiment of the compositions described herein according to Table 3 below. This exemplary concentrated viricidal composition was tested as part of a surfactant screening as set forth in Table 4A. The log virus reduction was measured for each of the formulations set forth in Tables 4A and 4B after 1 minute as shown in FIGS. 2A and 2B.

TABLE 3

Exemplary Concentrated Viricidal Composition

| Ingredients | wt. % |
|---|---|
| LAS | 6.84 |
| Benzyl Alcohol | 85.43 |
| Diphosphonic Acid | 0.39 |

TABLE 2A

| | Formulas (wt. %) | | | | | | | | |
|---|---|---|---|---|---|---|---|---|---|
| Ingredients | 1A | 1B | 1C | 1D | 1E | 1F | 1G | 1H | 1I |
| Water | 95.611 | 98.656 | 98.156 | 97.156 | 97.656 | 97.595 | 95.156 | 96.35 | 97.88 |
| DdBSA | 0.3 | 0.3 | 0.3 | 0.3 | 0.3 | 0.3 | 0.3 | 0.1 | 1 |
| Benzyl Alcohol | 3.75 | 0.5 | 1 | 2 | 2 | 2 | 4 | 3 | 0.5 |
| Diphosphonic Acid | 0.017 | 0.02 | 0.02 | 0.02 | 0.02 | 0.02 | 0.02 | 0.05 | 0.02 |
| sodium hydroxide 50% sol | 0.022 | 0.024 | 0.024 | 0.024 | 0.024 | 0.085 | 0.024 | 0 | 0.23 |
| Pluronic F127 | 0.3 | 0.5 | 0.5 | 0.5 | 0 | 0 | 0.5 | 0.5 | 0.5 |
| pH (100%) | 1.95 | 2.28 | 1.99 | 1.95 | 2.24 | 3.54 | 1.95 | 2.12 | 2.31 |

TABLE 3-continued

Exemplary Concentrated Viricidal Composition

| Ingredients | wt. % |
|---|---|
| sodium hydroxide, 50% | 0.50 |
| Pluronic F127 | 6.84 |

TABLE 4A

Surfactant Screening

| Ingredients | 2A | 2B | 2C | 2D | 2E | 2F | 2G | 2H |
|---|---|---|---|---|---|---|---|---|
| DI Water | 96 | 99.458 | 97.462 | 97.453 | 97.242 | 99.18 | 98.78 | 98.74 |
| Diphosphonic Acid | | 0.02 | 0.02 | 0.02 | 0.02 | 0.02 | 0.02 | 0.02 |
| Phenoxyethanol | | 0.51 | 0.49 | 0.51 | 0.5 | 0.49 | 0.51 | 0.49 |
| SXS | | | 2.01 | 1.98 | 2.02 | 0 | 0 | 0 |
| Methane sulfonic acid | | 0.012 | 0.018 | 0.017 | 0.018 | 0.02 | 0.02 | 0.19 |
| Neodecanoic acid | | | | 0.02 | | | | |
| Isononinoic acid | | | | | 0.2 | | | |
| Sodium laureth sulfate | | | | | | 0.29 | | |
| Sodium lauryl sulfate | | | | | | | 0.67 | |
| Dowfax 8390 | | | | | | | | 0.56 |
| Exemplary Concentrated Viricidal Composition | 4 | | | | | | | |
| pH(100%) | 2.3 | 2.60 | 2.60 | 2.60 | 2.58 | 2.62 | 2.65 | 2.73 |

TABLE 4B

Surfactant Screening

| Ingredients | 2I | 2J | 2K | 2L | 2M | 2N | 2O |
|---|---|---|---|---|---|---|---|
| DI Water | 98.9826 | 96.9824 | 98.97 | 99.144 | 96.943 | 99.25 | 99.073 |
| Diphosphonic Acid | 0.02 | 0.02 | 0.02 | 0.02 | 0.02 | 0.02 | 0.02 |
| Phenoxyethanol | 0.49 | 0.49 | 0.5 | 0.49 | 0.51 | 0.5 | 0.49 |
| SXS | | | | | 2 | | |
| Methane sulfonic acid | 0.0074 | 0.0076 | | 0.016 | 0.017 | | 0.017 |
| Sodium octyl sulfonate | 0.5 | 2.5 | | | | | |
| Sodium hydroxide 50% | | | | | | 0.02 | |
| Akypo LF4 | | | 0.51 | | | | |
| Stepwet DOS 70 | | | | 0.33 | | | |
| Alpha olefin (C14-16) sulfonate | | | | | 0.51 | | |
| DdBSA | | | | | | 0.21 | |
| Sulfonated oleic acid | | | | | | | 0.4 |
| pH(100%) | 2.73 | 2.76 | 2.68 | 2.70 | 2.66 | 2.82 | 2.60 |

As seen in FIG. 2A, Formula 2A encompassing the exemplary composition resulted in a log reduction of at least 5.0 after 1 minute of contact time. No other formulas achieved successful log virus reduction levels, with the exception of Formulas 2F and 2G, where both also achieved a log reduction of at least 5.0 after 1 minute of contact time. As seen in FIG. 2B, only Formulas 2L and 2O achieved a log reduction greater than 4.0, with both formulas having a log reduction of at least 5.0 after 1-minute contact time.

Example 2. Viricidal Tests

Multiple viricidal tests were conducted following ASTM E1053, Standard Test Method to Assess Virucidal Activity of Chemicals Intended for Disinfection of Inanimate, Nonporous Environmental Surfaces. Table 5A shows the exemplary composition tested. Table 5B shows the results of the testing against multiple viruses.

TABLE 5A

Exemplary Viricidal Composition

| Ingredients | wt. % |
|---|---|
| Water | 90-98 |
| DdBSA | 0.1-0.5 |
| Benzyl Alcohol | 1-5 |
| Diphosphonic Acid | 0.01-0.05 |
| Sodium Hydroxide (50% solution) | 0.01-0.05 |
| EO/PO Block Copolymer | 0.1-0.5 |
| pH (100%) | 2-3.2 |

TABLE 5B

| Virus name | Application | log inactivation |
|---|---|---|
| Adenovirus Type 5 strain Adenoid 75 ATCC VR-5 | Spray | 3.05 |
| Polio | Spray | ≥3.5 |
| Influenza A (H3N2) | Spray | ≥4.00 |
| Influenza A | Spray | ≥4.75 |
| Duck Hepatitus B | Spray | ≥3.75 |
| HIV Type 1 | Spray | ≥4.00 |
| Feline Calicivirus (Norovirus surrogate) | Spray | ≥4.79 |
| Feline Calicivirus (Norovirus surrogate) | Wipe | 5.75 |

As seen in Table 5B, the exemplary viricidal composition resulted in a log reduction of greater than 3.5 logs against polio, which is notoriously difficult to kill. Moreover, the kill log provided complete inactivation of the polio virus at 1-minute contact time. Similarly, the exemplary viricidal composition was tested against a variety of other microorganisms providing complete inactivation of two types of influenza A, Hepatitus B, HIV Type 1, and feline calicivirus. This demonstrates the surprising effectiveness of the composition against a variety of microorganisms. The test against feline calicivirus was performed both as a spray and with simple wiping. As can be seen from the log reduction data, while the exemplary composition was highly effective with both spray and wipe applications, the wipe provided significantly higher log reduction than the spray did. This demonstrates the superior cidal efficacy when the composition is applied by wiping. While the wipe test did not result in complete inactivation this is because the starting count of feline calcivirus was higher for the wipe test.

Example 3. Black Soil Removal Test

An exemplary industrial hydrocarbon-based oily soil (referred to as "black soil" throughout the Examples) was prepared with about 50 grams mineral spirits, about 5 grams mineral oil, about 5 grams motor oil, about 2.5 grams black pigment dispersion and about 37.5 grams bandy black clay was prepared.

Three tiles soiled with black soil were prepared. The back, grooved sides of a plurality of 3"×3" white vinyl tiles were soiled with approximately 0.75 grams of the black test soil using a 3" foam brush. The tiles were allowed to dry at room temperature overnight. The next day, the tiles were placed into a soaking tray containing about 200 grams of a test composition for about 2 minutes for the black soil.

The soil removal test was conducted using the Gardco Washability Test Equipment Model D10V available from Paul N. Gardner Company Inc., using a synthetic sponge. The dry synthetic sponge was saturated with about 80 grams of the test compositions. The tiles were then placed into the Gardco with the grain of the tiles parallel to the direction of sponge travel. The black soil tiles were then scrubbed with about 2 pounds of pressure with the moistened synthetic sponge for 40 cycles, rotating the tiles 90 degrees every 10 cycles for a complete 360-degree rotation of the tiles. The tiles were then rinsed with city water and dried overnight at room temperature. Hunter Lab L* reflectance of the washed tiles were measured. The average reflectance values from the three tiles are summarized in Table 6. A higher reflectance value indicates better cleaning efficacy.

TABLE 6

Black soil removal test using the Gardner soil removal method

| Product # | Product | Product Description | Avg. | Stdev |
|---|---|---|---|---|
| 1 | Water | Control | 26.91 | 1.94 |
| 2 | Exemplary Heavy-Duty Cleaner | Heavy-Duty Cleaner | 53.88 | 1.28 |
| 3 | Exemplary Disinfectant Cleaner | Competitive Disinfectant A | 20.4 | 0.87 |
| 4 | Exemplary Embodiment of a Viricidal Cleaning Solution | 1A | 50.58 | 4.22 |
| 5 | Exemplary Disinfectant with Hydrogen Peroxide | Competitive Disinfectant B | 23.06 | 3.04 |
| 8 | Exemplary Disinfectant with Bleach | Competitive Disinfectant C | 40.5 | 0.46 |
| 9 | Exemplary All-Purpose Cleaner | All-purpose cleaner | 42.34 | 3.54 |

Table 6 shows the black soil cleaning efficacy of an exemplary embodiment of a viricidal cleaning solution of the invention versus standard formulations for hard surface cleaning, and further compared to water as a control. The table shows that the formula of the invention provides better cleaning efficacy to the equivalent disinfectant viricidal compositions, and only minimally less effectiveness than a heavy-duty cleaner (not disinfectant). Thus, this illustrates the suitability of the formulations of the invention for providing an effective replacement for current available disinfectant viricidal compositions for removal of black soils.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof

What is claimed is:

1. A concentrated viricidal composition comprising:

between about 5 wt. % and about 10 wt. % of an anionic sulfonated surfactant comprising dodecylbenzene sulfonic acid;

between about 80 wt. % and about 90 wt. % of an aromatic alcohol solvent comprising benzyl alcohol;

between about 5 wt. % and about 10 wt. % of a nonionic surfactant comprising an ethylene oxide/propylene oxide (EO/PO) block copolymer; and between about 0.01 wt. % and about 0.5 wt. % of a water conditioning agent comprising a diphosphonic acid; and between about 0.01 wt. % and about 0.05 wt. % of sodium hydroxide;

wherein the ratio of aromatic alcohol solvent to anionic sulfonated surfactant is between about 8:1 and about 15:1;

wherein the composition has less than about 0.1 wt. % of added peroxide;

wherein the composition provides a pH of less than about 3 in a use solution formed with between about 90 wt. % water to about 98 wt. % water; and wherein the composition provides at least about 3.5 log reduction in polio in about 1 minute or less.

2. The composition of claim 1, wherein the composition further comprises an additional solvent.

3. The composition of claim 2, wherein the additional solvent comprises a phenoxypropanol, dipropylene glycol n-butyl ether, tripropylene glycol butyl ether, or a mixture thereof.

4. The composition of claim 1, wherein the composition provides a pH between about 2 and about 3 in the use solution.

5. The composition of claim 1, wherein the composition further comprises an additional surfactant, an additional pH modifier, a buffering agent, a dye, a fragrance, a foaming agent, a surface active agent, a solubilizer, a coupling agent, a hydrotrope, a defoaming agent, or mixture thereof.

* * * * *